United States Patent
Wang

(10) Patent No.: US 9,853,440 B2
(45) Date of Patent: Dec. 26, 2017

(54) GROUND DETECTING APPARATUS AND RELAY ACTION DETECTING APPARATUS

(71) Applicant: DELTA ELECTRONICS, INC., Taoyuan County (TW)

(72) Inventor: Ming-Whang Wang, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 309 days.

(21) Appl. No.: 14/819,993

(22) Filed: Aug. 6, 2015

(65) Prior Publication Data
US 2016/0105015 A1   Apr. 14, 2016

(30) Foreign Application Priority Data

Oct. 9, 2014   (TW) .............................. 103135124 A

(51) Int. Cl.
| | |
|---|---|
| *H02H 3/16* | (2006.01) |
| *H02H 3/33* | (2006.01) |
| *H02H 5/10* | (2006.01) |

(52) U.S. Cl.
CPC ............. *H02H 3/162* (2013.01); *H02H 5/105* (2013.01)

(58) Field of Classification Search
CPC   H02H 3/16; H02H 3/162; H02H 3/22; H02H 1/0015

USPC .......................................................... 361/42
See application file for complete search history.

(56) References Cited

U.S. PATENT DOCUMENTS

| | | | |
|---|---|---|---|
| 2008/0007880 A1* | 1/2008 | Bradley | H02H 11/002 361/46 |
| 2008/0112097 A1* | 5/2008 | Maharsi | H01H 9/542 361/13 |
| 2012/0229937 A1* | 9/2012 | Ramamurthy | H02H 5/047 361/18 |
| 2013/0063849 A1* | 3/2013 | Liu | H02H 3/202 361/86 |
| 2013/0265683 A1* | 10/2013 | Gueltig | G05F 1/56 361/86 |

* cited by examiner

*Primary Examiner* — Dharti Patel
(74) *Attorney, Agent, or Firm* — Hauptman Ham, LLP

(57) ABSTRACT

A ground detecting apparatus at least includes a metal oxide semiconductor field effect transistor and a high voltage resistor. The metal oxide semiconductor field effect transistor is used to replace a photo-coupler for switching. The high voltage resistor is used for safety isolation. A relay action detecting apparatus at least includes a metal oxide semiconductor field effect transistor and a high voltage resistor. The metal oxide semiconductor field effect transistor is used to replace a photo-coupler for switching. The high voltage resistor is used for safety isolation.

8 Claims, 5 Drawing Sheets

GROUND DETECTING APPARATUS AND RELAY ACTION DETECTING APPARATUS

BACKGROUND OF THE INVENTION

Field of the Invention

The present invention relates to a detecting apparatus and an action detecting apparatus, and especially relates to a ground detecting apparatus and a relay action detecting apparatus.

Description of the Related Art

A ground detecting apparatus (namely, a ground monitor interrupter) is used for monitoring the ground state of an electronic apparatus. A user gets an electrical shock easily and the electronic apparatus is damaged easily due to an electric leakage if the ground state of the electronic apparatus is not completed. It is very dangerous. Therefore, the ground detecting apparatus is very important for the safety of the user and the electronic apparatus.

Currently, a related art ground detecting apparatus comprises a photo-coupler for isolation. However, the cost of the photo-coupler is high. The input impedance of the photo-coupler is low. The power consumption of the high voltage resistor of the driver is increased due to the photo-coupler. The printed circuit board layout of the photo-coupler is difficult.

Moreover, a relay action detecting apparatus is used for detecting whether functions of the relays are normal or not when the electronic apparatus is turned on. Currently, a related art relay action detecting apparatus comprises a photo-coupler for isolation. However, the cost of the photo-coupler is high. The input impedance of the photo-coupler is low. The power consumption of the high voltage resistor of the driver is increased due to the photo-coupler. The printed circuit board layout of the photo-coupler is difficult.

SUMMARY OF THE INVENTION

In order to solve the above-mentioned problems, an object of the present invention is to provide a ground detecting apparatus.

In order to solve the above-mentioned problems, another object of the present invention is to provide a ground detecting apparatus.

In order to solve the above-mentioned problems, another object of the present invention is to provide a relay action detecting apparatus.

In order to solve the above-mentioned problems, another object of the present invention is to provide a relay action detecting apparatus.

In order to achieve the object of the present invention mentioned above, the ground detecting apparatus is electrically connected to an alternating current power supply apparatus. The ground detecting apparatus comprises a diode unit, a high voltage resistor, a metal oxide semiconductor field effect transistor and a controller. The diode unit is electrically connected to the alternating current power supply apparatus and generates a direct current voltage. The high voltage resistor comprises a first terminal and a second terminal. The first terminal of the high voltage resistor is electrically connected to the diode unit. The second terminal of the high voltage resistor is electrically connected to a first terminal of a first resistor. A second terminal of the first resistor is electrically connected to a ground terminal. The metal oxide semiconductor field effect transistor comprises a drain, a gate and a source. The gate is electrically connected to the high voltage resistor and the first resistor. The source is electrically connected to the ground terminal. The controller is electrically connected to the drain. The direct current voltage is divided by the high voltage resistor and the first resistor to obtain a judgment voltage to send to the gate. An on-off state of the metal oxide semiconductor field effect transistor is determined with the judgment voltage, and then a voltage level of the drain is changed to generate a pulse voltage signal. The controller performs detection according to the pulse voltage signal.

In order to achieve another object of the present invention mentioned above, the ground detecting apparatus is electrically connected to an alternating current power supply apparatus. The ground detecting apparatus comprises a first high voltage resistor, a second high voltage resistor, a metal oxide semiconductor field effect transistor, a Zener diode and a controller. The first high voltage resistor comprises a first terminal and a second terminal. The first terminal of the first high voltage resistor is coupled to the alternating current power supply apparatus. The second terminal of the first high voltage resistor is electrically connected to a first terminal of a first resistor. A second terminal of the first resistor is electrically connected to a ground terminal. The second high voltage resistor is electrically connected to the alternating current power supply apparatus, the first high voltage resistor and the first resistor. The metal oxide semiconductor field effect transistor comprises a drain, a gate and a source. The gate is electrically connected to the first high voltage resistor, the second high voltage resistor and the first resistor. The source is electrically connected to the ground terminal. The Zener diode is electrically connected to the metal oxide semiconductor field effect transistor. The Zener diode clamps a judgment voltage to protect the metal oxide semiconductor field effect transistor to prevent the gate from excessive voltage. The metal oxide semiconductor field effect transistor is turned on and the gate is in a low voltage state when a voltage of the ground terminal is higher than a voltage of the alternating current power supply apparatus. The controller is electrically connected to the drain. The first high voltage resistor, the second high voltage resistor and the first resistor generates the judgment voltage to send to the gate. An on-off state of the metal oxide semiconductor field effect transistor is determined with the judgment voltage, and then a voltage level of the drain is changed to generate a pulse voltage signal. The controller performs detection according to the pulse voltage signal.

In order to achieve another object of the present invention mentioned above, the relay action detecting apparatus is coupled to two power lines of an alternating current power supply apparatus through a first relay and a second relay respectively. The relay action detecting apparatus comprises a first diode, a second diode, a high voltage resistor, a metal oxide semiconductor field effect transistor and a controller. The first diode comprises a first terminal and a second terminal. The first terminal of the first diode is electrically connected to the first relay. The second diode comprises a first terminal and a second terminal. The first terminal of the second diode is electrically connected to the second relay. The second terminal of the second diode is electrically connected to the second terminal of the first diode. The first diode and the second diode generate a direct current voltage. The high voltage resistor comprises a first terminal and a second terminal. The first terminal of the high voltage resistor is electrically connected to the second terminal of the first diode and the second terminal of the second diode. The second terminal of the high voltage resistor is electrically connected to a first terminal of a first resistor. A second terminal of the first resistor is electrically connected to a ground terminal. The metal oxide semiconductor field effect transistor comprises a drain, a gate and a source. The gate is electrically connected to the high voltage resistor and the first resistor. The source is electrically connected to the ground terminal. The controller is electrically connected to the drain. The direct current voltage is divided by the high voltage resistor and the first resistor to obtain a judgment voltage to send to the gate. An on-off state of the metal oxide semiconductor field effect transistor is determined with the judgment voltage, and then a voltage level of the drain is changed to generate a pulse voltage signal. The controller performs detection according to the pulse voltage signal.

In order to achieve another object of the present invention mentioned above, the relay action detecting apparatus is coupled to two power lines of an alternating current power supply apparatus through a first relay and a second relay respectively. The relay action detecting apparatus comprises a first high voltage resistor, a second high voltage resistor, a metal oxide semiconductor field effect transistor, a Zener diode and a controller. The first high voltage resistor comprises a first terminal and a second terminal. The first terminal of the first high voltage resistor is coupled to the alternating current power supply apparatus. The second terminal of the first high voltage resistor is electrically connected to a first terminal of a first resistor. A second terminal of the first resistor is electrically connected to a ground terminal. The second high voltage resistor is electrically connected to the alternating current power supply apparatus, the first high voltage resistor and the first resistor. The metal oxide semiconductor field effect transistor comprises a drain, a gate and a source. The gate is electrically connected to the first high voltage resistor, the second high voltage resistor and the first resistor. The source is electrically connected to the ground terminal. The Zener diode is electrically connected to the metal oxide semiconductor field effect transistor. The Zener diode clamps a judgment voltage to protect the metal oxide semiconductor field effect transistor to prevent the gate from excessive voltage. The metal oxide semiconductor field effect transistor is turned on and the gate is in a low voltage state when a voltage of the ground terminal is higher than a voltage of the alternating current power supply apparatus. The controller is electrically connected to the drain. The first high voltage resistor, the second high voltage resistor and the first resistor generates the judgment voltage to send to the gate. An on-off state of the metal oxide semiconductor field effect transistor is determined with the judgment voltage, and then a voltage level of the drain is changed to generate a pulse voltage signal. The controller performs detection according to the pulse voltage signal.

The advantage of the present invention is to reduce the cost of the ground detecting apparatus and the cost of the relay action detecting apparatus.

DETAILED DESCRIPTION OF THE INVENTION

Figure 1:
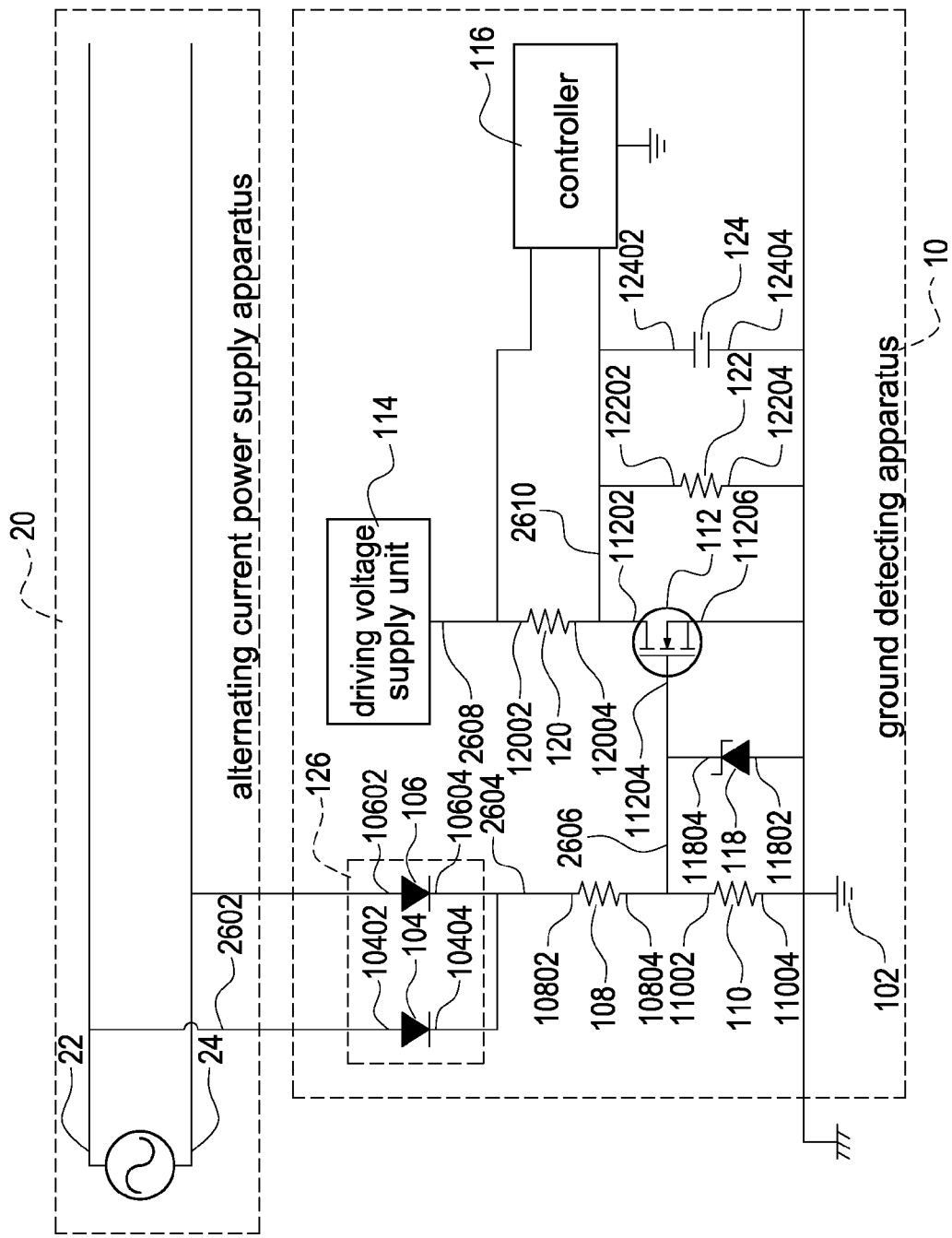
FIG. 1 shows a circuit diagram of an embodiment of the ground detecting apparatus of the present invention.

FIG. 1 shows a circuit diagram of an embodiment of the ground detecting apparatus of the present invention. A ground detecting apparatus 10 is electrically connected to an alternating current power supply apparatus 20. The ground detecting apparatus 10 comprises a ground terminal 102, a high voltage resistor 108, a first resistor 110, a metal oxide semiconductor field effect transistor 112, a driving voltage supply unit 114, a controller 116, a Zener diode 118, a current limiting resistor 120, a second resistor 122, a capacitor 124 and a diode unit 126.

The high voltage resistor 108 comprises a first terminal 10802 and a second terminal 10804. The first resistor 110 comprises a first terminal 11002 and a second terminal 11004. The metal oxide semiconductor field effect transistor 112 comprises a drain 11202, a gate 11204 and a source 11206.

The diode unit 126 is electrically connected to the alternating current power supply apparatus 20 and generates a direct current voltage 2604. The first terminal 10802 of the high voltage resistor 108 is electrically connected to the diode unit 126. The second terminal 10804 of the high voltage resistor 108 is connected to the first terminal 11002 of the first resistor 110. The second terminal 11004 of the first resistor 110 is electrically connected to the ground terminal 102. The gate 11204 is electrically connected to the high voltage resistor 108 and the first resistor 110. The source 11206 is electrically connected to the ground terminal 102. The controller 116 is electrically connected to the drain 11202.

The direct current voltage 2604 is divided by the high voltage resistor 108 and the first resistor 110 to obtain a judgment voltage 2606 to send to the gate 11204. An on-off state of the metal oxide semiconductor field effect transistor 112 is determined with the judgment voltage 2606, and then a voltage level of the drain 11202 is changed to generate a pulse voltage signal 2610. The controller 116 performs detection according to the pulse voltage signal 2610.

A plurality of resistors in series forms the high voltage resistor 108. The alternating current power supply apparatus 20 and the metal oxide semiconductor field effect transistor 112 are complied with a safety regulation of high voltage isolation according to a withstanding voltage of each of the resistors. The controller 116 compares the pulse voltage signal 2610 with a predetermined value to determine a ground state. The predetermined value can be a time value or a frequency value. The diode unit 126 comprises a first diode 104 and a second diode 106 which are electrically connected to a line wire 22 and a neutral wire 24 (namely, two power lines) of the alternating current power supply apparatus 20 respectively to generate the direct current voltage 2604 with rectification.

The Zener diode 118 is electrically connected to the metal oxide semiconductor field effect transistor 112. The Zener diode 118 clamps the judgment voltage 2606 to protect the metal oxide semiconductor field effect transistor 112 to prevent the gate from excessive voltage. The driving voltage supply unit 114 and the current limiting resistor 120 are arranged in series and electrically connected to the metal oxide semiconductor field effect transistor 112. The driving voltage supply unit 114 provides the voltage level. The second resistor 122 and the capacitor 124 are connected in parallel. One side of the second resistor 122 and the capacitor 124 are electrically connected to the drain 11202. The other side of the second resistor 122 and the capacitor 124 are connected to the ground terminal 102 to reduce the noise which interfere the controller 116.

The first diode 104 comprises a first terminal 10402 (anode) and a second terminal 10404 (cathode). The second diode 106 comprises a first terminal 10602 (anode) and a second terminal 10604 (cathode). The Zener diode 118 comprises an anode 11802 and a cathode 11804. The current limiting resistor 120 comprises a first terminal 12002 and a second terminal 12004. The second resistor 122 comprises a first terminal 12202 and a second terminal 12204. The capacitor 124 comprises a first terminal 12402 and a second terminal 12404.

The first terminal 10402 of the first diode 104 is electrically connected to the line wire 22 of the alternating current power supply apparatus 20. The first terminal 10602 of the second diode 106 is electrically connected to the neutral wire 24 of the alternating current power supply apparatus 20. The second terminal 10604 of the second diode 106 is electrically connected to the second terminal 10404 of the first diode 104. The cathode 11804 of the Zener diode 118 is electrically connected to the second terminal 10804 of the high voltage resistor 108, the first terminal 11002 of the first resistor 110 and the gate 11204. The anode 11802 of the Zener diode 118 is electrically connected to the ground terminal 102. The first terminal 12002 of the current limiting resistor 120 is electrically connected to the driving voltage supply unit 114 and the controller 116. The second terminal 12004 of the current limiting resistor 120 is electrically connected to the drain 11202 and the controller 116. The first terminal 12202 of the second resistor 122 is electrically connected to the drain 11202, the controller 116 and the second terminal 12004 of the current limiting resistor 120. The second terminal 12204 of the second resistor 122 is electrically connected to the ground terminal 102. The first terminal 12402 of the capacitor 124 is electrically connected to the drain 11202, the controller 116, the second terminal 12004 of the current limiting resistor 120 and the first terminal 12202 of the second resistor 122. The second terminal 12404 of the capacitor 124 is electrically connected to the ground terminal 102.

Figure 4:
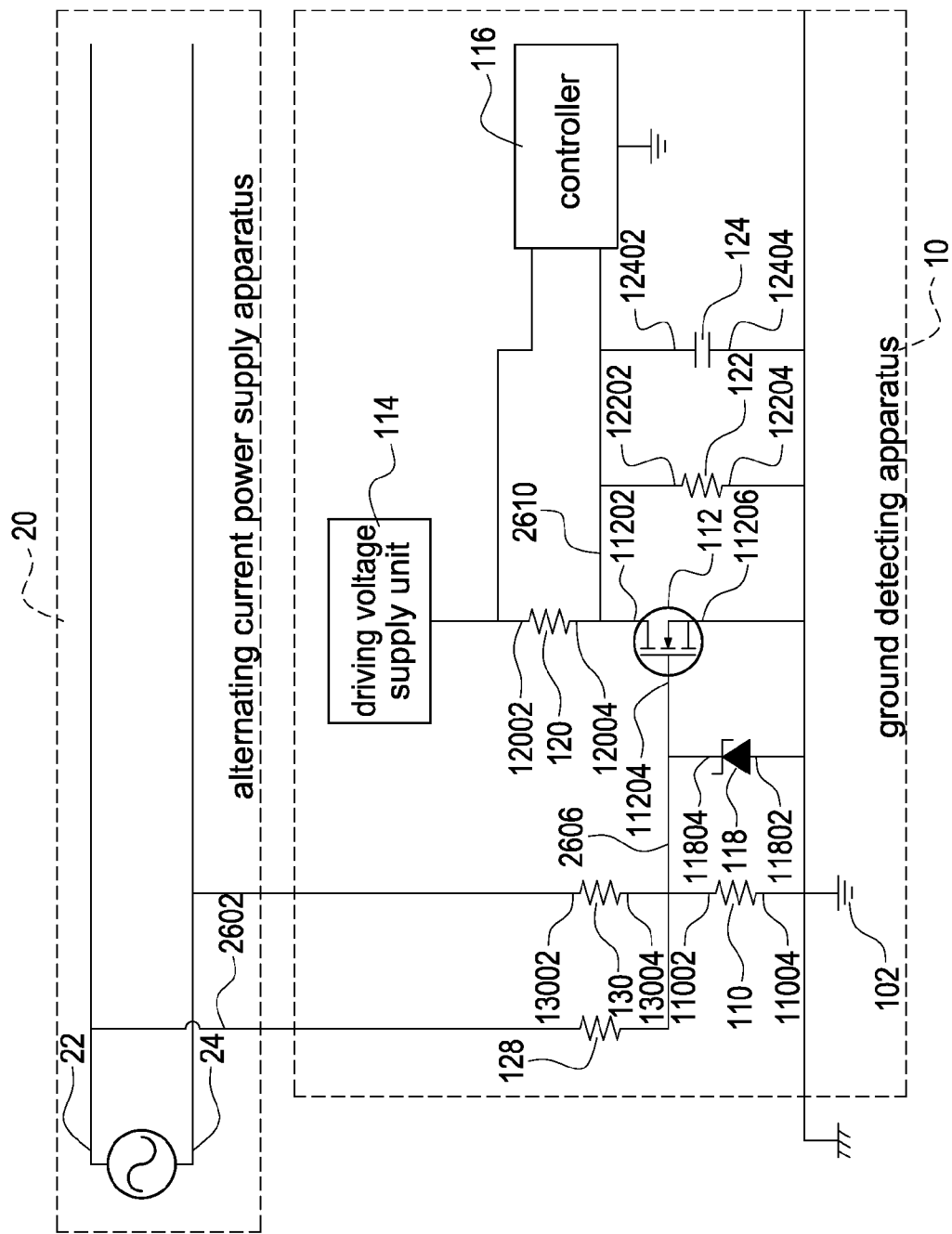
FIG. 4 shows a circuit diagram of another embodiment of the ground detecting apparatus of the present invention.

FIG. 4 shows a circuit diagram of another embodiment of the ground detecting apparatus of the present invention. A ground detecting apparatus 10 is electrically connected to an alternating current power supply apparatus 20. The ground detecting apparatus 10 comprises a ground terminal 102, a first high voltage resistor 130, a first resistor 110, a metal oxide semiconductor field effect transistor 112, a driving voltage supply unit 114, a controller 116, a Zener diode 118, a current limiting resistor 120, a second resistor 122, a capacitor 124 and a second high voltage resistor 128.

The first high voltage resistor 130 comprises a first terminal 13002 and a second terminal 13004. The first resistor 110 comprises a first terminal 11002 and a second terminal 11004. The metal oxide semiconductor field effect transistor 112 comprises a drain 11202, a gate 11204 and a source 11206.

The first terminal 13002 of the first high voltage resistor 130 is coupled to the alternating current power supply apparatus 20. The second terminal 13004 of the first high voltage resistor 130 is connected to the first terminal 11002 of the first resistor 110. The second terminal 11004 of the first resistor 110 is electrically connected to the ground terminal 102. The gate 11204 is electrically connected to the first high voltage resistor 130, the second high voltage resistor 128 and the first resistor 110. The source 11206 is electrically connected to the ground terminal 102. The controller 116 is electrically connected to the drain 11202.

The Zener diode 118 is electrically connected to the metal oxide semiconductor field effect transistor 112. The Zener diode 118 clamps a judgment voltage 2606 to protect the metal oxide semiconductor field effect transistor 112 to prevent the gate from excessive voltage. The metal oxide semiconductor field effect transistor 112 is turned on and the gate 11204 is in a low voltage state when a voltage of the ground terminal 102 is higher than a voltage of the alternating current power supply apparatus 20. The second high voltage resistor 128 is electrically connected to the alternating current power supply apparatus 20, the first high voltage resistor 130 and the first resistor 110.

The first high voltage resistor 130, the second high voltage resistor 128 and the first resistor 110 generates the judgment voltage 2606 to send to the gate 11204. An on-off state of the metal oxide semiconductor field effect transistor 112 is determined with the judgment voltage 2606, and then a voltage level of the drain 11202 is changed to generate a pulse voltage signal 2610. The controller 116 performs detection according to the pulse voltage signal 2610.

A plurality of resistors in series forms the first high voltage resistor 130. A plurality of resistors in series forms the second high voltage resistor 128. The Zener diode 118 rectifies the judgment voltage 2606.

The Zener diode 118 comprises an anode 11802 and a cathode 11804. The current limiting resistor 120 comprises a first terminal 12002 and a second terminal 12004. The second resistor 122 comprises a first terminal 12202 and a second terminal 12204. The capacitor 124 comprises a first terminal 12402 and a second terminal 12404. The alternating current power supply apparatus 20 comprises a line wire 22 and a neutral wire 24 (namely, two power lines). The alternating current power supply apparatus 20 sends an alternating current power 2602 to the ground detecting apparatus 10.

Figure 2:
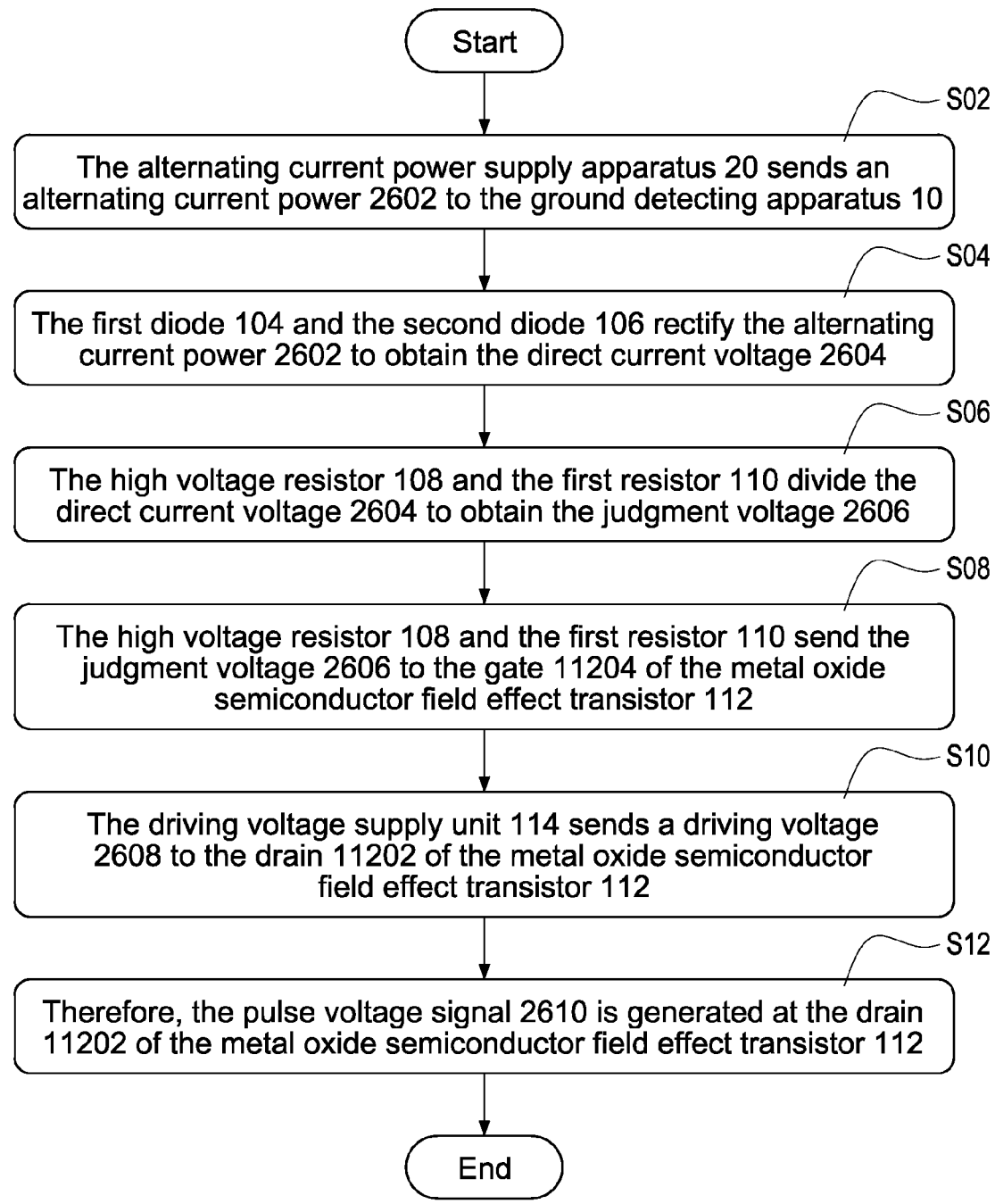
FIG. 2 shows a flow chart of a first embodiment of the ground detecting method of the present invention.

FIG. 2 shows a flow chart of a first embodiment of the ground detecting method of the present invention. Please refer to FIG. 1 at the same time. The flow chart shown in FIG. 2 comprises following steps.

S02: The alternating current power supply apparatus 20 sends an alternating current power 2602 to the ground detecting apparatus 10.

S04: The first diode 104 and the second diode 106 rectify the alternating current power 2602 to obtain the direct current voltage 2604.

S06: The high voltage resistor 108 and the first resistor 110 divide the direct current voltage 2604 to obtain the judgment voltage 2606.

S08: The high voltage resistor 108 and the first resistor 110 send the judgment voltage 2606 to the gate 11204 of the metal oxide semiconductor field effect transistor 112.

S10: The driving voltage supply unit 114 sends a driving voltage 2608 to the drain 11202 of the metal oxide semiconductor field effect transistor 112.

S12: Therefore, the pulse voltage signal 2610 is generated at the drain 11202 of the metal oxide semiconductor field effect transistor 112.

The pulse voltage signal 2610 is sent to the controller 116. The controller 116 is aware that a ground continuity test is normal if a pulse width of the pulse voltage signal 2610 received by the controller 116 is greater than a predetermined pulse width. The controller 116 is aware that the ground continuity test is abnormal if the pulse width of the pulse voltage signal 2610 received by the controller 116 is not greater than the predetermined pulse width. Therefore, the controller 116 will proceed for further processing (for examples, warning or stopping charging).

The cost of the metal oxide semiconductor field effect transistor 112 is lower than the cost of the photo-coupler used in the related art ground detecting apparatus. The input impedance of the metal oxide semiconductor field effect transistor 112 is high. The power consumption of the high voltage resistor is reduced due to the metal oxide semiconductor field effect transistor 112. The ground detecting apparatus 10 can reduce the alternating current leakage current and is reliable for the ground monitor interrupter.

Figure 3:
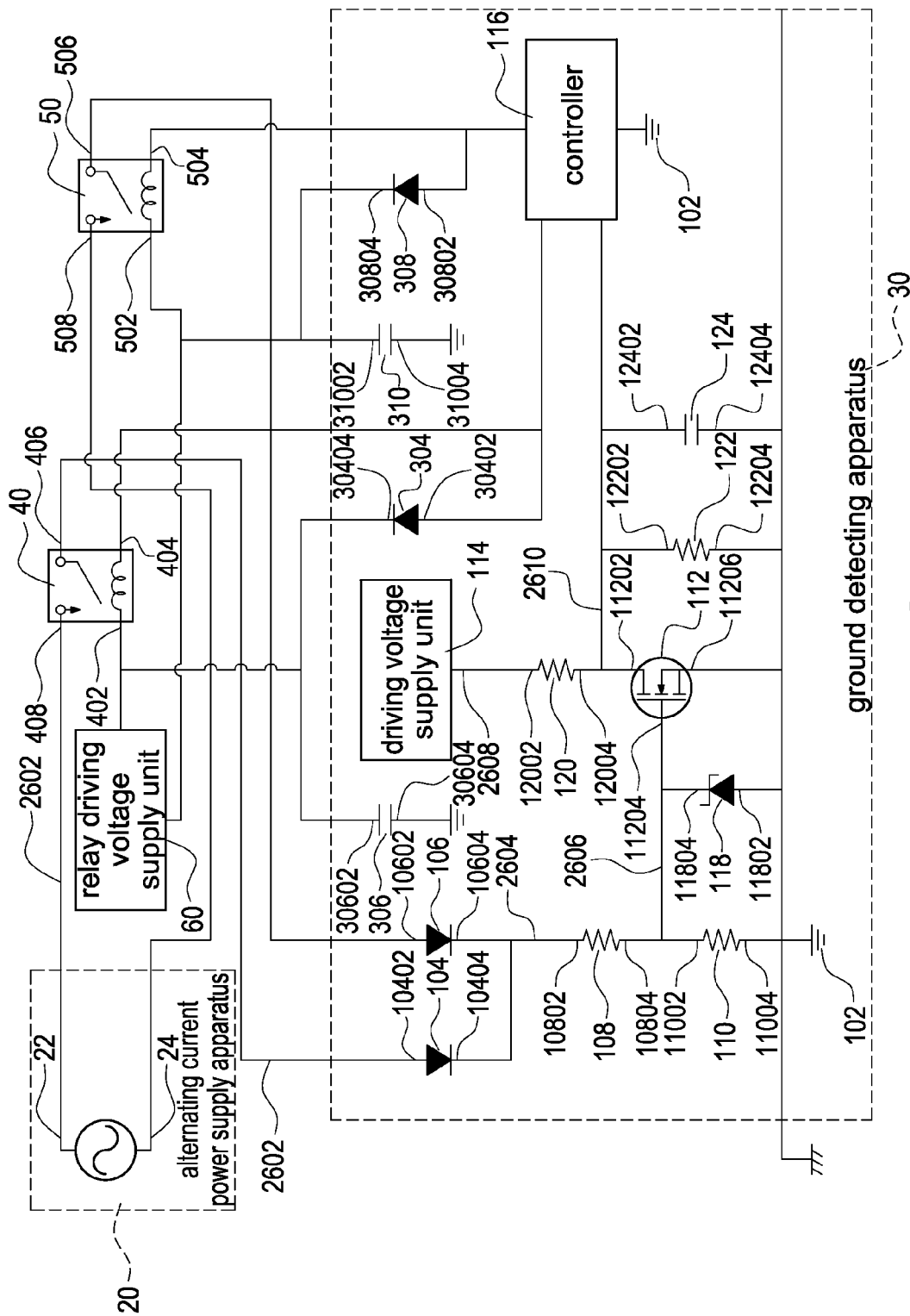
FIG. 3 shows a circuit diagram of an embodiment of the relay action detecting apparatus of the present invention.

FIG. 3 shows a circuit diagram of an embodiment of the relay action detecting apparatus of the present invention. A relay action detecting apparatus 30 is coupled to a line wire 22 and a neutral wire 24 (namely, two power lines) of an alternating current power supply apparatus 20 through a first relay 40 and a second relay 50 respectively.

The relay action detecting apparatus 30 comprises a ground terminal 102, a first diode 104, a second diode 106, a high voltage resistor 108, a first resistor 110, a metal oxide semiconductor field effect transistor 112, a driving voltage supply unit 114, a controller 116, a Zener diode 118, a current limiting resistor 120, a second resistor 122, a capacitor 124, a third diode 304, a first capacitor 306, a fourth diode 308 and a second capacitor 310.

The first diode 104 comprises a first terminal 10402 (anode) and a second terminal 10404 (cathode). The second diode 106 comprises a first terminal 10602 (anode) and a second terminal 10604 (cathode). The high voltage resistor 108 comprises a first terminal 10802 and a second terminal 10804. The first resistor 110 comprises a first terminal 11002 and a second terminal 11004. The metal oxide semiconductor field effect transistor 112 comprises a drain 11202, a gate 11204 and a source 11206.

The first terminal 10402 of the first diode 104 is electrically connected to the first relay 40. The first terminal 10602 of the second diode 106 is electrically connected to the second relay 50. The second terminal 10604 of the second diode 106 is electrically connected to the second terminal 10404 of the first diode 104. The second diode 106 and the first diode 104 generate a direct current voltage 2604. The first terminal 10802 of the high voltage resistor 108 is electrically connected to the second terminal 10404 of the first diode 104 and the second terminal 10604 of the second diode 106. The second terminal 10804 of the high voltage resistor 108 is electrically connected to the first terminal 11002 of the first resistor 110. The second terminal 11004 of the first resistor 110 is electrically connected to the ground terminal 102. The gate 11204 is electrically connected to the high voltage resistor 108 and the first resistor 110. The source 11206 is electrically connected to the ground terminal 102. The controller 116 is electrically connected to the drain 11202.

The direct current voltage 2604 is divided by the high voltage resistor 108 and the first resistor 110 to obtain a judgment voltage 2606 to send to the gate 11204. An on-off state of the metal oxide semiconductor field effect transistor 112 is determined with the judgment voltage 2606, and then a voltage level of the drain 11202 is changed to generate a pulse voltage signal 2610. The controller 116 performs detection according to the pulse voltage signal 2610.

A plurality of resistors in series forms the high voltage resistor 108. The alternating current power supply apparatus 20 and the metal oxide semiconductor field effect transistor 112 are complied with a safety regulation of high voltage isolation according to a withstanding voltage of each of the resistors. The controller 116 compares the pulse voltage signal 2610 with a predetermined value to determine the action of the first relay 40 and the second relay 50.

The Zener diode 118 is electrically connected to the metal oxide semiconductor field effect transistor 112. The Zener diode 118 clamps the judgment voltage 2606 to protect the metal oxide semiconductor field effect transistor 112 to prevent the gate from excessive voltage. The driving voltage supply unit 114 and the current limiting resistor 120 are arranged in series and electrically connected to the metal oxide semiconductor field effect transistor 112. The driving voltage supply unit 114 provides the voltage level. The second resistor 122 and the capacitor 124 are connected in parallel. One side of the second resistor 122 and the capacitor 124 are electrically connected to the drain 11202. The other side of the second resistor 122 and the capacitor 124 are connected to the ground terminal 102 to reduce the noise which interfere the controller 116.

The first relay 40 comprises a first pin 402, a second pin 404, a third pin 406 and a fourth pin 408. The second relay 50 comprises a first pin 502, a second pin 504, a third pin 506 and a fourth pin 508. The Zener diode 118 comprises an anode 11802 and a cathode 11804. The current limiting resistor 120 comprises a first terminal 12002 and a second terminal 12004. The second resistor 122 comprises a first terminal 12202 and a second terminal 12204. The capacitor 124 comprises a first terminal 12402 and a second terminal 12404. The third diode 304 comprises an anode 30402 and a cathode 30404. The first capacitor 306 comprises a first terminal 30602 and a second terminal 30604. The fourth diode 308 comprises an anode 30802 and a cathode 30804. The second capacitor 310 comprises a first terminal 31002 and a second terminal 31004.

The first pin 402 of the first relay 40 is electrically connected to a relay driving voltage supply unit 60. The fourth pin 408 of the first relay 40 is electrically connected to the line wire 22 of the alternating current power supply apparatus 20. The first pin 502 of the second relay 50 is electrically connected to the relay driving voltage supply unit 60. The second pin 504 of the second relay 50 is electrically connected to the controller 116. The third pin 506 of the second relay 50 is electrically connected to the first terminal 10602 of the second diode 106. The fourth pin 508 of the second relay 50 is electrically connected to the neutral wire 24 of the alternating current power supply apparatus 20.

The controller 116 is electrically connected to the drain 11202, the driving voltage supply unit 114 and the second pin 404 of the first relay 40. The cathode 11804 of the Zener diode 118 is electrically connected to the second terminal 10804 of the high voltage resistor 108, the first terminal 11002 of the first resistor 110 and the gate 11204. The anode 11802 of the Zener diode 118 is electrically connected to the ground terminal 102. The first terminal 12002 of the current limiting resistor 120 is electrically connected to the driving voltage supply unit 114. The second terminal 12004 of the current limiting resistor 120 is electrically connected to the drain 11202 and the controller 116.

The first terminal 12202 of the second resistor 122 is electrically connected to the drain 11202, the controller 116 and the second terminal 12004 of the current limiting resistor 120. The second terminal 12204 of the second resistor 122 is electrically connected to the ground terminal 102. The first terminal 12402 of the capacitor 124 is electrically connected to the drain 11202, the controller 116, the second terminal 12004 of the current limiting resistor 120 and the first terminal 12202 of the second resistor 122. The second terminal 12404 of the capacitor 124 is electrically connected to the ground terminal 102.

The anode 30402 of the third diode 304 is electrically connected to the second pin 404 of the first relay 40 and the controller 116. The cathode 30404 of the third diode 304 is electrically connected to the relay driving voltage supply unit 60 and the first pin 402 of the first relay 40. The first terminal 30602 of the first capacitor 306 is electrically connected to the relay driving voltage supply unit 60, the first pin 402 of the first relay 40 and the cathode 30404 of the third diode 304. The second terminal 30604 of the first capacitor 306 is electrically connected to the ground terminal 102.

The anode 30802 of the fourth diode 308 is electrically connected to the second pin 504 of the second relay 50 and the controller 116. The cathode 30804 of the fourth diode 308 is electrically connected to the relay driving voltage supply unit 60 and the first pin 502 of the second relay 50. The first terminal 31002 of the second capacitor 310 is electrically connected to the relay driving voltage supply unit 60, the first pin 502 of the second relay 50 and the cathode 30804 of the fourth diode 308. The second terminal 31004 of the second capacitor 310 is electrically connected to the ground terminal 102.

The cost of the metal oxide semiconductor field effect transistor 112 is lower than the cost of the photo-coupler used in the related art relay action detecting apparatus. The input impedance of the metal oxide semiconductor field effect transistor 112 is high. The power consumption of the high voltage resistor is reduced due to the metal oxide semiconductor field effect transistor 112.

Figure 5:
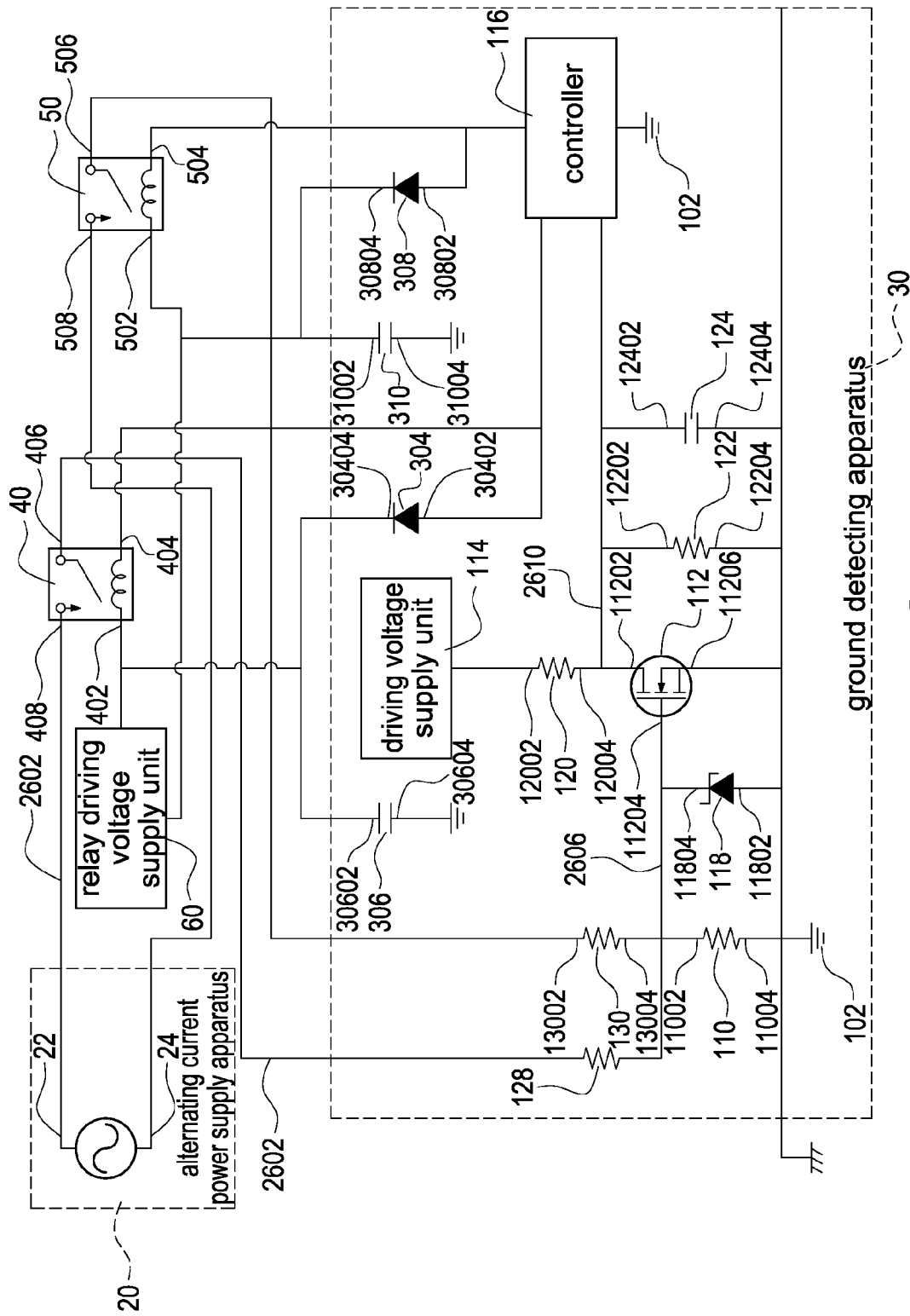
FIG. 5 shows a circuit diagram of another embodiment of the relay action detecting apparatus of the present invention.

FIG. 5 shows a circuit diagram of another embodiment of the relay action detecting apparatus of the present invention. A relay action detecting apparatus 30 is coupled to two power lines (namely, a line wire 22 and a neutral wire 24) of an alternating current power supply apparatus 20 through a first relay 40 and a second relay 50 respectively.

The relay action detecting apparatus 30 comprises a ground terminal 102, a first high voltage resistor 130, a first resistor 110, a metal oxide semiconductor field effect transistor 112, a driving voltage supply unit 114, a controller 116, a Zener diode 118, a current limiting resistor 120, a second resistor 122, a capacitor 124, a second high voltage resistor 128, a third diode 304, a first capacitor 306, a fourth diode 308 and a second capacitor 310.

The first high voltage resistor 130 comprises a first terminal 13002 and a second terminal 13004. The first resistor 110 comprises a first terminal 11002 and a second terminal 11004. The metal oxide semiconductor field effect transistor 112 comprises a drain 11202, a gate 11204 and a source 11206.

The first terminal 13002 of the first high voltage resistor 130 is coupled to the alternating current power supply apparatus 20. The second terminal 13004 of the first high voltage resistor 130 is connected to the first terminal 11002 of the first resistor 110. The second terminal 11004 of the first resistor 110 is electrically connected to the ground terminal 102. The gate 11204 is electrically connected to the first high voltage resistor 130, the second high voltage resistor 128 and the first resistor 110. The source 11206 is electrically connected to the ground terminal 102. The controller 116 is electrically connected to the drain 11202.

The Zener diode 118 is electrically connected to the metal oxide semiconductor field effect transistor 112. The Zener diode 118 clamps a judgment voltage 2606 to protect the metal oxide semiconductor field effect transistor 112 to prevent the gate from excessive voltage. The metal oxide semiconductor field effect transistor 112 is turned on and the gate 11204 is in a low voltage state when a voltage of the ground terminal 102 is higher than a voltage of the alternating current power supply apparatus 20. The second high voltage resistor 128 is electrically connected to the alternating current power supply apparatus 20, the first high voltage resistor 130 and the first resistor 110.

The first high voltage resistor 130, the second high voltage resistor 128 and the first resistor 110 generates the judgment voltage 2606 to send to the gate 11204. An on-off state of the metal oxide semiconductor field effect transistor 112 is determined with the judgment voltage 2606, and then a voltage level of the drain 11202 is changed to generate a pulse voltage signal 2610. The controller 116 performs detection according to the pulse voltage signal 2610.

A plurality of resistors in series forms the first high voltage resistor 130. A plurality of resistors in series forms the second high voltage resistor 128. The Zener diode 118 rectifies the judgment voltage 2606.

The first relay 40 comprises a first pin 402, a second pin 404, a third pin 406 and a fourth pin 408. The second relay 50 comprises a first pin 502, a second pin 504, a third pin 506 and a fourth pin 508. The Zener diode 118 comprises an anode 11802 and a cathode 11804. The current limiting resistor 120 comprises a first terminal 12002 and a second terminal 12004. The second resistor 122 comprises a first terminal 12202 and a second terminal 12204. The capacitor 124 comprises a first terminal 12402 and a second terminal 12404. The third diode 304 comprises an anode 30402 and a cathode 30404. The first capacitor 306 comprises a first terminal 30602 and a second terminal 30604. The fourth diode 308 comprises an anode 30802 and a cathode 30804. The second capacitor 310 comprises a first terminal 31002 and a second terminal 31004. The alternating current power supply apparatus 20 sends an alternating current power 2602 to the relay action detecting apparatus 30. The first pin 402 of the first relay 40 is electrically connected to a relay driving voltage supply unit 60.

The advantage of the present invention is to reduce the cost of the ground detecting apparatus and the cost of the relay action detecting apparatus.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A ground detecting apparatus electrically connected to an alternating current power supply apparatus, the ground detecting apparatus comprising:

a diode unit electrically connected to the alternating current power supply apparatus and generating a direct current voltage;

a high voltage resistor comprising a first terminal and a second terminal, the first terminal of the high voltage resistor electrically connected to the diode unit, the second terminal of the high voltage resistor electrically connected to a first terminal of a first resistor, a second terminal of the first resistor electrically connected to a ground terminal;

a metal oxide semiconductor field effect transistor comprising a drain, a gate and a source, the gate electrically connected to the high voltage resistor and the first resistor, the source electrically connected to the ground terminal; and a controller electrically connected to the drain, wherein the direct current voltage is divided by the high voltage resistor and the first resistor to obtain a judgment voltage to send to the gate; an on-off state of the metal oxide semiconductor field effect transistor is determined with the judgment voltage, and then a voltage level of the drain is changed to generate a pulse voltage signal; the controller performs detection according to the pulse voltage signal.

2. The ground detecting apparatus in claim 1, wherein a plurality of resistors in series forms the high voltage resistor; the alternating current power supply apparatus and the metal oxide semiconductor field effect transistor are complied with a safety regulation of high voltage isolation according to a withstanding voltage of each of the resistors.

3. The ground detecting apparatus in claim 1, wherein the controller compares the pulse voltage signal with a predetermined value to determine a ground state.

4. The ground detecting apparatus in claim 3, wherein the predetermined value is a time value or a frequency value.

5. The ground detecting apparatus in claim 1, wherein the diode unit comprises a first diode and a second diode electrically connected to two power lines of the alternating current power supply apparatus respectively to generate the direct current voltage with rectification.

6. The ground detecting apparatus in claim 5, further comprising a zener diode electrically connected to the metal oxide semiconductor field effect transistor, the zener diode clamping the judgment voltage to protect the metal oxide semiconductor field effect transistor to prevent the gate from excessive voltage.

7. The ground detecting apparatus in claim 6, further comprising a driving voltage supply unit and a current limiting resistor, the driving voltage supply unit and the current limiting resistor arranged in series and electrically connected to the metal oxide semiconductor field effect transistor, the driving voltage supply unit providing the voltage level.

8. The ground detecting apparatus in claim 7, further comprising a second resistor and a capacitor, the second resistor and the capacitor connected in parallel, one side of the second resistor and the capacitor electrically connected to the drain, the other side of the second resistor and the capacitor connected to the ground terminal to reduce noises interfering the controller.

* * * * *